(12) United States Patent
Jaradi et al.

(10) Patent No.: US 10,953,834 B2
(45) Date of Patent: Mar. 23, 2021

(54) BULKHEAD MOUNTED AIRBAG FOR FRONT SEAT

(71) Applicant: Ford Global Technologies, LLC, Dearborn, MI (US)

(72) Inventors: Dean M. Jaradi, Macomb, MI (US); Mohammad Omar Faruque, Ann Arbor, MI (US); S. M. Iskander Farooq, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 69 days.

(21) Appl. No.: 16/382,966

(22) Filed: Apr. 12, 2019

(65) Prior Publication Data
US 2020/0324727 A1    Oct. 15, 2020

(51) Int. Cl.
*B60R 21/205* (2011.01)
*B60R 21/237* (2006.01)
*B60R 21/231* (2011.01)
*B60R 21/16* (2006.01)

(52) U.S. Cl.
CPC .......... *B60R 21/205* (2013.01); *B60R 21/231* (2013.01); *B60R 21/237* (2013.01); *B60R 2021/161* (2013.01)

(58) Field of Classification Search
CPC ................ B60R 21/205; B60R 21/237; B60R 2021/161
See application file for complete search history.

(56) References Cited

U.S. PATENT DOCUMENTS

| 3,618,978 | A |   | 11/1971 | Klove, Jr. et al. |
|---|---|---|---|---|
| 3,642,303 | A | * | 2/1972 | Irish ....................... B60R 21/233 280/730.1 |
| 4,198,075 | A | * | 4/1980 | Kob .......................... B60R 21/02 280/728.3 |
| 5,482,230 | A | * | 1/1996 | Bird ........................... B64C 1/10 244/118.5 |
| 5,513,877 | A |   | 5/1996 | MacBrien et al. |
| 5,649,721 | A | * | 7/1997 | Stafford .................. B60R 21/04 244/118.5 |
| 5,775,729 | A | * | 7/1998 | Schneider ........... B60R 21/2171 280/728.2 |
| 7,048,298 | B2 | * | 5/2006 | Arwood ................ B60R 21/206 280/730.1 |
| 7,552,943 | B2 | * | 6/2009 | Pal ........................ B60R 21/045 280/730.1 |
| 8,220,830 | B2 |   | 7/2012 | Takimoto et al. |
| 9,566,929 | B1 |   | 2/2017 | Belwafa et al. |

(Continued)

FOREIGN PATENT DOCUMENTS

JP        2010254188 A    11/2010

*Primary Examiner* — Faye M Fleming
(74) *Attorney, Agent, or Firm* — Frank A. MacKenzie; Bejin Bieneman PLC (57) ABSTRACT

A system includes a bulkhead, a seat spaced from the bulkhead, and an airbag supported by the bulkhead and inflatable towards the seat to an inflated position. The airbag in the inflated position includes a vertex spaced from the bulkhead, a knee-impacting portion tapering from the vertex downwardly and towards the bulkhead, and a head-impacting portion extending upwardly from the vertex. The head-impacting portion includes a head-receiving depression. The head-receiving depression is round.

19 Claims, 6 Drawing Sheets

(56) References Cited

U.S. PATENT DOCUMENTS

| | | | |
|---|---|---|---|
| 10,336,279 B2 * | 7/2019 | Farooq | B60R 21/205 |
| 2013/0001934 A1 * | 1/2013 | Nagasawa | B60R 21/203 |
| | | | 280/731 |
| 2013/0106079 A1 * | 5/2013 | Jarboe | B64D 11/06 |
| | | | 280/730.1 |
| 2017/0057453 A1 | 3/2017 | Morris et al. | |
| 2018/0229681 A1 | 8/2018 | Jaradi et al. | |
| 2018/0345895 A1 | 12/2018 | Farooq et al. | |

* cited by examiner

BULKHEAD MOUNTED AIRBAG FOR FRONT SEAT

BACKGROUND

During a vehicle impact, occupants may move in a direction influenced by the momentum of the vehicle. In a frontal vehicle impact, an occupant may be biased toward a vehicle component, e.g., an instrument panel, in front of the occupant. Some vehicle impacts, e.g., front impact, side impact, frontal offset impacts, far side oblique impact, near side oblique impact, etc., may cause the occupants to move at an angle towards vehicle components or another occupant.

DETAILED DESCRIPTION

A system includes a bulkhead, a seat spaced from the bulkhead, and an airbag supported by the bulkhead and inflatable towards the seat to an inflated position. The airbag in the inflated position includes a vertex spaced from the bulkhead, a knee-impacting portion tapering from the vertex downwardly and towards the bulkhead, and a head-impacting portion extending upwardly from the vertex and including a head-receiving depression. The head-receiving depression being round.

The airbag may include sides spaced from each other in a cross-vehicle direction and extending along the head-impacting portion and the knee-impacting portion. The head-receiving depression may be spaced from each side.

The system may include front pillars spaced from each other in the cross-vehicle direction. The sides of the airbag may be spaced from each front pillar.

The system may include a base supported by the bulkhead and supporting the airbag. The head-impacting portion may be inflatable upwardly relative to the base and the knee-impacting portion may be inflatable downwardly relative to the base.

The system may include a base supported by the bulkhead and supporting the airbag. The head-impacting portion and the knee-impacting portion may be rolled in opposite directions relative to the base in an uninflated position.

The head-impacting portion may taper upwardly and towards the bulkhead.

The system may include an inflator in fluid communication with the airbag. The inflator may be supported by the bulkhead and elongated in a cross-vehicle direction.

The bulkhead may be generally planar.

The bulkhead may support a user interface. The head-impacting portion in the inflated position may be disposed between the seat and the user interface.

The bulkhead may include a recess extending away from the seat, the airbag is disposed in the recess.

The system may include a second seat spaced from the bulkhead and a second airbag supported by the bulkhead and inflatable towards the second seat to the inflated position. The second seat and the second airbag each may be spaced from the seat and the airbag in a cross-vehicle direction. The second airbag may be identical to the airbag.

The system may include a second inflator spaced from the inflator and in fluid communication with the second airbag. The second inflator may be supported by the bulkhead and elongated in a cross-vehicle direction.

The bulkhead may include two recesses each being disposed in front of one respective seat. Each airbag may be disposed in one respective recess.

The head-receiving depression may be positioned to receive a head of an occupant between 5th-percentile female and 95th-percentile male stature sitting in the seat.

The knee-impacting portion may be disposed adjacent to knees of an occupant between 5th-percentile female and 95th-percentile male stature sitting in the seat.

An airbag assembly includes a base and an airbag supported by the base and inflatable to an inflated position. The airbag in the inflated position includes a vertex spaced from the base, a knee-impacting portion tapering from the vertex downwardly and towards the base, and a head-impacting portion extending upwardly from the vertex and including a head-receiving depression. The head-receiving depression being round.

The airbag may include sides spaced from each other and extending along the head-impacting portion and the knee-impacting portion. The head-receiving depression may be spaced from each side.

The head-impacting portion may be inflatable upwardly relative to the base, and the knee-impacting portion may be inflatable downwardly relative to the base.

The head-impacting portion and the knee-impacting portion may be rolled in opposite directions relative to the base in an uninflated position.

The head-impacting portion may taper upwardly and towards the base.

With reference to the Figures, wherein like numerals indicate like parts throughout the several views, a vehicle 10 is generally shown. The vehicle 10 includes a system 12 having a bulkhead 14, a seat 16 spaced from the bulkhead 14, and an airbag 18 supported by the bulkhead 14 and inflatable towards the seat 16 to an inflated position. The airbag 18 in the inflated position includes a vertex 20 spaced from the bulkhead 14, a knee-impacting portion 22 tapering from the vertex 20 downwardly and towards the bulkhead 14, and a head-impacting portion 24 extending upwardly from the vertex 20. The head-impacting portion 24 includes a head-receiving depression 26. The head-receiving depression 26 is round.

Figure 1:
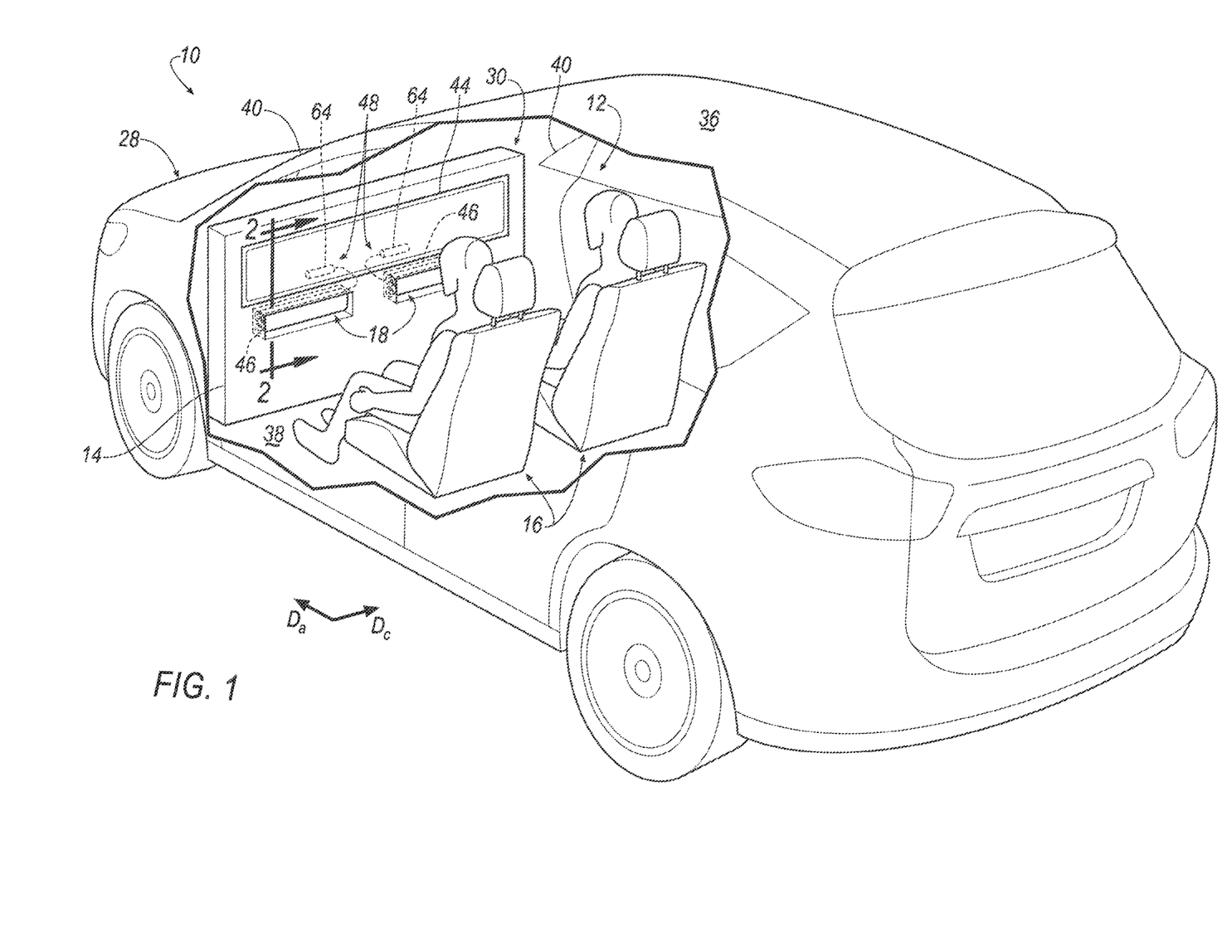
FIG. 1 is a perspective view of a vehicle with an airbag assembly in an uninflated position.
Figure 2:
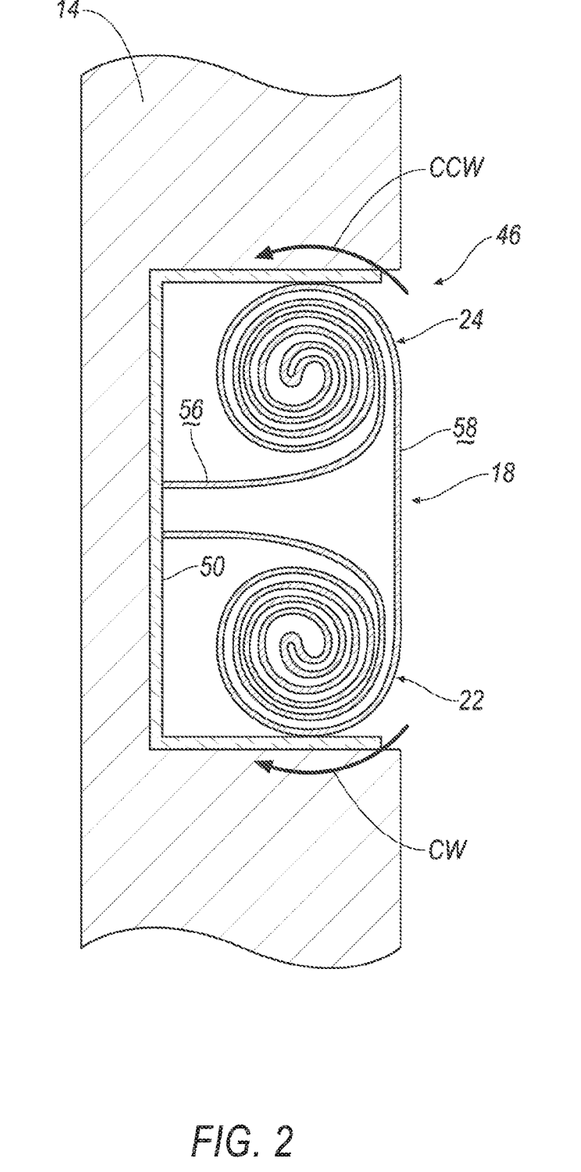
FIG. 2 is a cross sectional view along line 2 of the vehicle with the airbag assembly in the uninflated position.
Figure 3:
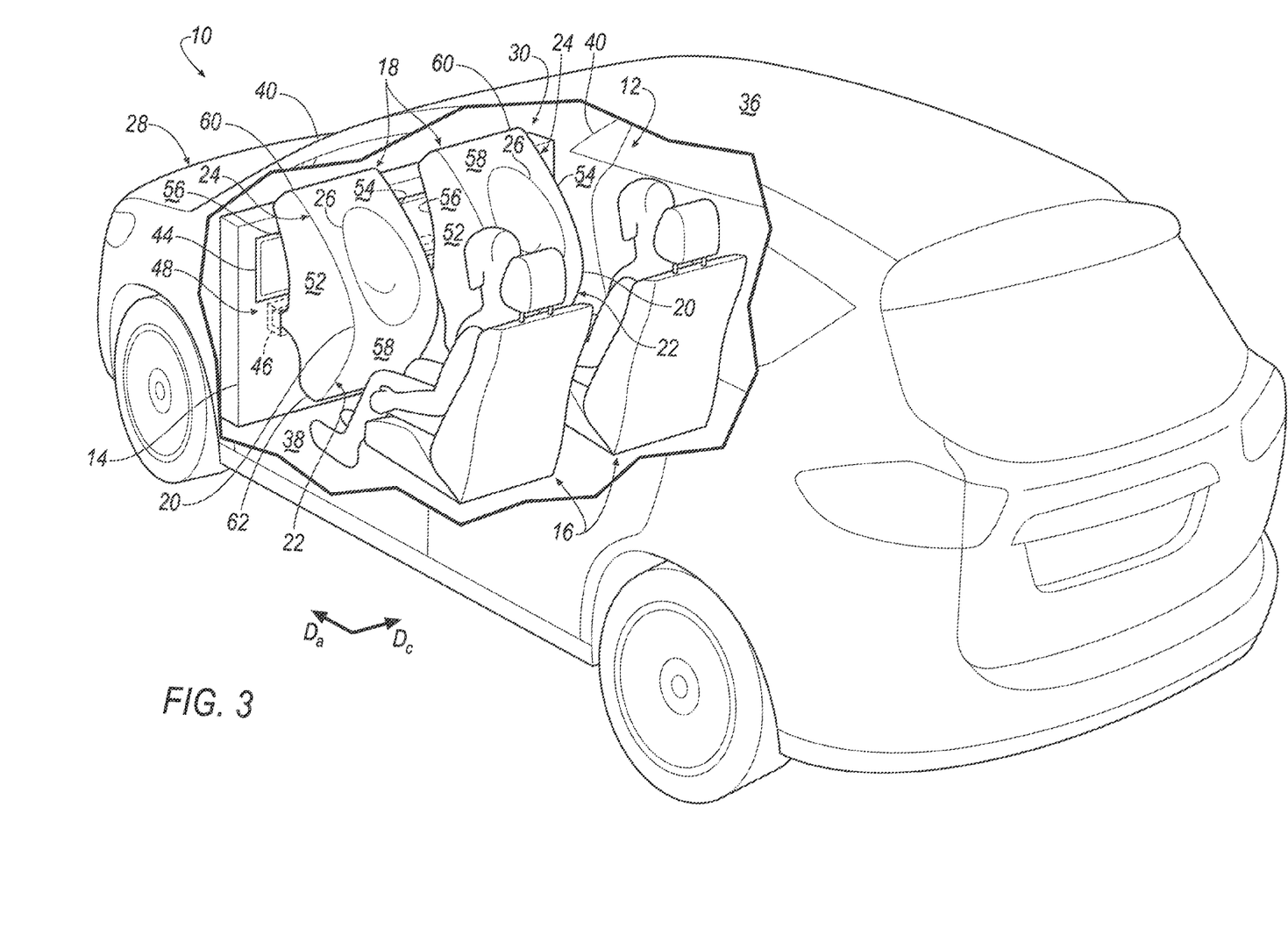
FIG. 3 is a perspective view of the vehicle with the airbag assembly in an inflated position.
Figure 4A:
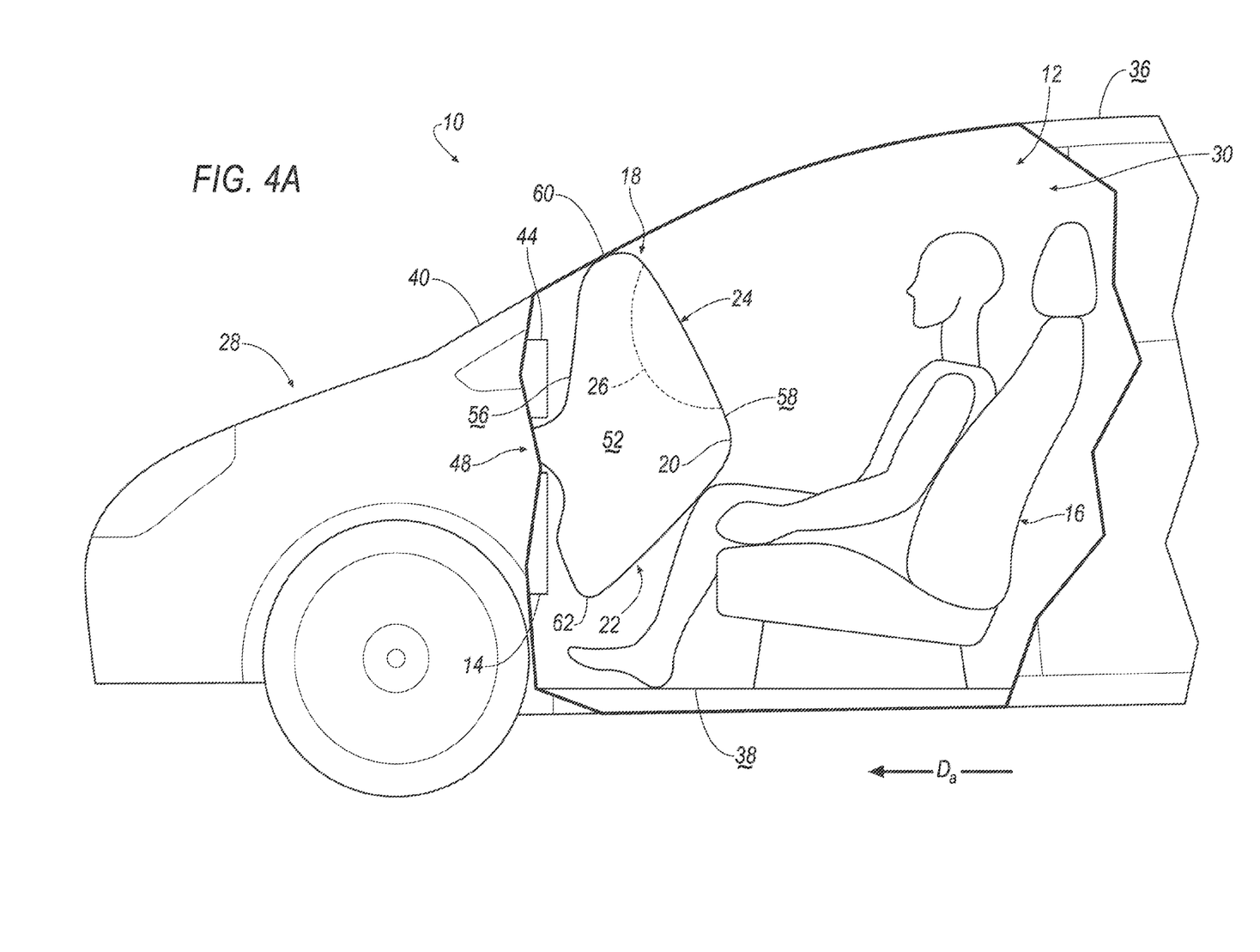
FIG. 4A is a side view of the vehicle with the airbag assembly in the inflated position and an occupant spaced from an airbag.
Figure 4B:
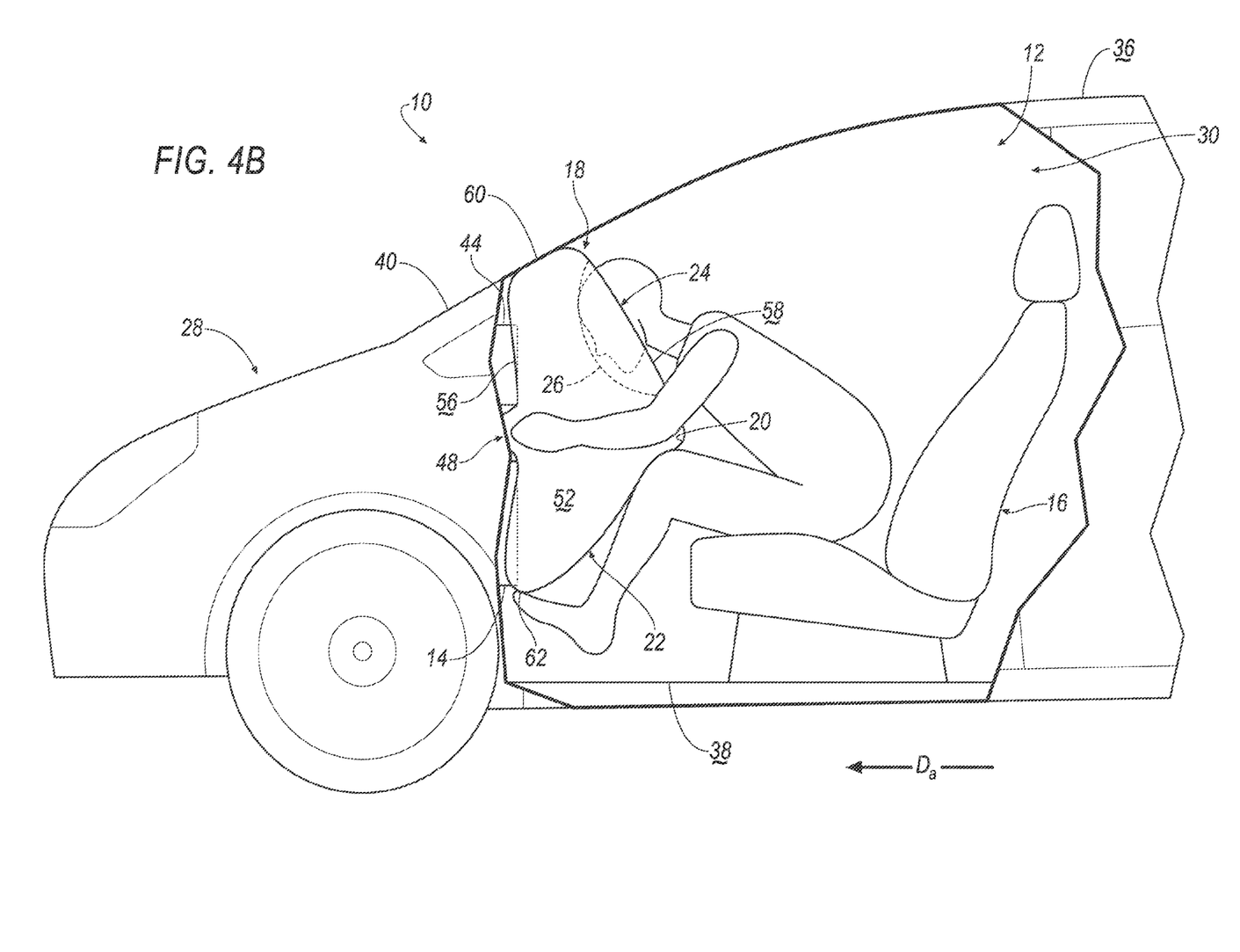
FIG. 4B is a side view of the vehicle with the airbag assembly in the inflated position and the occupant impacting the airbag.

During a vehicle impact, the airbag 18 may be inflatable from an uninflated position, as shown in FIGS. 1 and 2, to an inflated position, as shown in FIGS. 3-4B. During the vehicle impact, an occupant may be forced into the airbag 18 in the inflated position. During a frontal impact, the airbag 18 may provide coverage so as to control the kinematics of the knees and head of the occupant. During these types of impacts, the head-receiving depression 26 may control the kinematics of the head of the occupant, and the knee-impacting portion 22 may control the kinematics of the knees of the occupant. Specifically, the head-receiving depression 26 and the knee-impacting portion 22 may urge the occupant to remain generally upright and centered on the airbag 18. For example, some vehicle impacts, e.g., side impact, frontal offset impacts, far side oblique impact, near side oblique impact, etc., may cause occupants to move at an angle towards vehicle components, e.g., a door hinge, an A-pillar, etc. During these types of impacts, the airbag 18, i.e., the head-receiving depression 26, may slow or stop the head of the occupant from sliding across the airbag 18. Said differently, the head-receiving depression 26 may assist in retaining the head of occupant on the airbag 18. In any direction of vehicle impact that causes the knees to impact the knee-impacting portion 22, the knee-impacting portion 22 urges the knees of the occupant to remain upright, which urges the torso of the occupant to remain upright to align the head of the occupant with the head-receiving depression 26.

The vehicle 10 may be any suitable type of automobile, e.g., a passenger or commercial automobile such as a sedan, a coupe, a truck, a sport utility vehicle, a crossover vehicle, a van, a minivan, a taxi, a bus, etc. The vehicle 10, for example, may be an autonomous vehicle. In other words, the vehicle 10 may be autonomously operated such that the vehicle 10 may be driven without constant attention from a driver, i.e., the vehicle 10 may be self-driving without human input.

The vehicle 10 may include two sides (not numbered) spaced from each other in the cross-vehicle direction Dc. The sides of the vehicle 10 may be elongated in the vehicle fore-and-aft direction Da. Each side of the vehicle 10 may be similar or identical to each other.

With reference to FIG. 1, the vehicle 10 may include a body 28 defining a passenger cabin 30 to house occupants, if any, of the vehicle 10. The passenger cabin 30 may extend across the vehicle 10, i.e., from one side to the other side of the vehicle 10. The passenger cabin 30 includes a front end (not numbered) and a rear end (not numbered) with the front end being in front of the rear end during forward movement of the vehicle 10. The passenger cabin 30 includes one or more seats 16. The seats 16 may be arranged in any suitable arrangement. For example, one or more of the seats 16 may be at the front end of the passenger cabin 30, i.e., a front seat 16, and/or one or more of the seats 16 may be at the rear end of the passenger cabin 30, i.e., a rear seat. Specifically, the passenger cabin 30 may include two front seats 16 spaced from each other in the cross-vehicle direction Dc.

The body 28 may include a roof 36, a floor 38 spaced from the roof 36, and front pillars 40 extending downwardly from the roof 36, i.e., generally towards the floor 38, as shown in FIGS. 1, 3, and 4A-4B. The roof 36 and the floor 38 may each extend across the passenger cabin 30, i.e., from one side to the other side of the vehicle 10. The roof 36 may define an upper boundary of the passenger cabin 30 and the floor 38 may define a lower boundary of the passenger cabin 30.

Each seat 16 is supported by the floor 38, as shown in FIGS. 1, 3, and 4A-B. The position and orientation of the seats 16 and components thereof may be adjustable by an occupant. In this situation, each seat 16 may slide relative to the floor 38, e.g., in the vehicle fore-and-aft direction Da, along a seat track (not shown). As another example, each seat 16 may be fixed relative to the floor 38. In this situation, the seats 16 may be immovable relative to the floor 38.

With reference to FIG. 1, the front pillars 40 may be spaced from each other in the cross-vehicle direction Dc. In other words, one front pillar 40 may be disposed on one side of the vehicle 10, and the other front pillar 40 may be disposed on the other side of the vehicle 10. The front pillars 40 may be disposed at the front end of the passenger cabin 30, e.g., in front of the front seats 16.

The vehicle 10 may include a windshield (not numbered) extending from one side of the vehicle 10 to the other side of the vehicle 10. In other words, the windshield may extend from one front pillar 40 to the other front pillar 40. The windshield may extend from the roof 36 along the front pillars 40, i.e., towards the floor 38.

The bulkhead 14 may be disposed in front of the front seats 16, e.g., at the front end of the passenger cabin 30, as shown in FIG. 1. The bulkhead 14 may extend from one side of the vehicle 10 to the other side of the vehicle 10, i.e., across the passenger cabin 30 in the cross-vehicle direction Dc. For example, the bulkhead 14 may extend from one front pillar 40 to the other front pillar 40. Additionally, the bulkhead 14 may extend from the windshield to the floor 38. In other words, the front pillars 40 and the windshield both may extend from the roof 36 to the bulkhead 14. The bulkhead 14 may, for example, be fixed to a support (not shown). The support may be elongated in the cross-vehicle direction Dc, e.g., from one side of the vehicle 10 to the other side of the vehicle 10. Additionally, or alternatively, the bulkhead 14 may be fixed to the floor 38 from one side of the vehicle 10 to the other side of the vehicle 10. In this situation, the bulkhead 14 may be fixed to the floor 38 in any suitable manner, e.g., welding, fasteners, etc.

The bulkhead 14 may face the front seats 16. The bulkhead 14 may, for example, be a class-A surface, i.e., a surface specifically manufactured to have a high quality, finished aesthetic appearance free of blemishes. The bulkhead 14 may support a plurality of vehicle components. In other words, the bulkhead 14 may be referred to as "an instrument panel." For example, the bulkhead 14 may support a user interface 44. The user interface 44 may face the front seats 16. The user interface 44 may be elongated in the cross-vehicle direction Dc, i.e., across the bulkhead 14. For example, the user interface 44 may extend along the bulkhead 14 in front of both front seats 16, as shown in FIG. 1. The user interface 44 may be any suitable type of interface. For example, the user interface 44 present information to the occupants of the vehicle 10. The user interface 44 may include dials, digital recorders, screens such as a touch-sensitive display screen, speakers, etc. for providing information to the occupant. Additionally, or alternatively, the user interface 44 may receive information from the occupants of the vehicle 10. Said differently, the user interface 44 may be a human-machine interface (HMI). The user interface 44 may include buttons, knobs, keypads, microphones, etc. for receiving information from the occupant.

The bulkhead 14 may, for example, be flat in the cross-vehicle direction Dc, as shown in FIG. 1. In other words, the bulkhead 14 may be generally planar. In such an example, the bulkhead 14 may create additional packaging constraints for mounting and supporting airbags 18 in the passenger cabin 30. In this situation, the bulkhead 14 may include a recess 46 designed, i.e., sized and positioned, to receive and support the airbag 18, as set forth further below.

The recess 46 may face the front seats 16 and extend away from the front seats 16. The recess 46 may extend any suitable amount away from the front seats 16. The recess 46 may be disposed at any suitable position on the bulkhead 14, e.g., between the floor 38 and the windshield.

With reference to FIG. 1, the recess 46 may be elongated in the cross-vehicle direction Dc. The recess 46 may extend any suitable amount in the cross-vehicle direction Dc. For example, the recess 46 may extend partially across the bulkhead 14 in the cross-vehicle direction Dc. In other words, the recess 46 may be spaced from at least one front pillar 40. In such an example, the recess 46 may be disposed in front of one front seat 16, e.g., in the vehicle fore-and-aft direction Da. The recess 46 may have any suitable shape, e.g., rectangle, square, etc.

The bulkhead 14 may include any suitable number of recesses 46. For example, the bulkhead 14 may include two recesses 46, as shown in FIG. 1. In this situation, each recess 46 may be disposed in front of one respective seat 16. In other words, one recess 46 may be disposed in front of one front seat 16 and the other recess 46 may be disposed in front of the other front seat 16. Said differently, the recesses 46 may be spaced from each other in the cross-vehicle direction Dc. As another example, the bulkhead 14 may include one recess 46. In such an example, the recess 46 may be disposed, i.e., extend across the bulkhead 14, in front of both front seats 16.

With reference to FIG. 1, the system 12 may include an airbag assembly 48, which includes the airbag 18. The bulkhead 14 may support the airbag assembly 48, and specifically, may support the airbag 18 when the airbag 18 is in the inflated position, as set forth further below. The airbag 18 may be inflatable from the bulkhead 14 in the vehicle fore-and-aft direction Da, i.e., towards the front seats 16. The system 12 may include any suitable number of airbag assemblies 48. For example, the system 12 may include two airbag assemblies 48. In such an example, each airbag assembly 48 may be supported by the bulkhead 14 in front of one front seat 16. In other words, one airbag 18 may be disposed in front of one front seat 16 and another airbag 18 may be disposed in front of the other front seat 16. Said differently, the airbags 18 may be spaced from each other in the cross-vehicle direction Dc.

The airbag assembly 48 may, for example, be fixed to the bulkhead 14. In such an example, each airbag assembly 48, i.e., each airbag 18, may be disposed in one respective recess 46, as shown in FIGS. 1 and 2. In such an example, the bulkhead 14 may include a cover (not shown) extending over the airbag assembly 48 for allowing the airbags 18 to break through the bulkhead 14 when the airbags 18 are inflated to the inflated position. The tear seam may be disposed adjacent to the airbags 18 in the uninflated position.

The airbag assembly 48 may include a base 50 mounted to the bulkhead 14, i.e., in the recess 46, and supporting the airbag 18, as shown in FIG. 2. The base 50 may be flat. As another example, the base 50 may include a cavity (not numbered) that may house the airbag 18 in the uninflated position and may support the airbag 18 on the bulkhead 14 in the inflated position. The base 50 may be elongated in the cross-vehicle direction Dc. The base 50 may, for example, include clips, panels, etc. for attaching the respective airbag 18 and for attaching the respective airbag assembly 48 to the bulkhead 14. Alternatively, the airbag assembly 48 may be mounted directly to the bulkhead 14. In such an example, the airbag 18 may include clips, panels, etc., for attaching to the bulkhead 14.

The airbag 18 may be formed of any suitable type of material, e.g., from a woven polymer. For example, the airbag 18 may be formed of woven nylon yarn, e.g., nylon 6. Other suitable examples include polyether ether ketone (PEEK), polyetherketoneketone (PEKK), polyester, or any other suitable polymer. The woven polymer may include a coating such as silicone, neoprene, urethane, polyorganosiloxane, etc.

The airbag 18 may be a single continuous unit, e.g., a single piece of fabric. Alternatively, the airbag 18 may include a plurality of segments, i.e., two or more. The segments may be attached to each other in any suitable fashion, e.g., a plurality of panels attached by stitching, ultrasonic welding, etc.

In the inflated position, the airbag 18 may include sides 52, 54 spaced from each other in the cross-vehicle direction Dc, as shown in FIG. 3. Each side 52, 54 of the airbag 18 may be spaced from the front pillars 40. Each side 52, 54 of the airbag 18 may extend along the head-impacting portion 24 and the knee-impacting portion 22. The airbag 18 may extend, e.g., from one side 52 to the other side 54, across one front seat 16 in the cross-vehicle direction Dc. In other words, the sides 52, 54 of the airbag 18 may be disposed on opposite sides of the one front seat 16. In this situation, each front seat 16 may be spaced from one respective airbag 18 in the cross-vehicle direction Dc, as shown in FIG. 3.

The airbag 18 may include a forward-facing panel 56 and a rearward-facing panel 58 facing in opposite directions in the inflated position, as shown in FIGS. 4A-4B. The forward-facing panel 56, in the inflated position, may, for example, face the bulkhead 14. In other words, the forward-facing panel 56 may face away from the occupants of the passenger cabin 30. The forward-facing panel 56 may be disposed between the rearward-facing panel 58 and the bulkhead 14. The rearward-facing panel 58, in the inflated position, may, for example, face an intended occupant, e.g., the occupant of one front seat 16. The rearward-facing panel 58 is positioned to receive and be impacted by the occupant when the airbag 18 is inflated during an impact that urges the occupant toward the airbag 18. In other words, the rearward-facing panel 58 may be referred to as "an impact panel." Each of the forward-facing panel 56 and the rearward facing panel may extend from one side 52 to the other side 54 of the airbag 18.

The airbag 18, e.g., the rearward-facing panel 58 and the forward-facing panel 56, may define an inflation chamber (not shown). During inflation, the inflation chamber may be inflated from the uninflated position to the inflated position. The rearward-facing panel 58 is spaced from the base 50, i.e., the bulkhead 14, in the inflated position, as shown in FIGS. 4A-4B. For example, the rearward-facing panel 58 is adjacent the occupant of one front seat 16 in the inflated position. During inflation, the forward-facing panel 56 and the rearward-facing panel 58 may be inflatable upwardly and downwardly relative to the base 50. The rearward-facing panel 58 may, for example, extend upwardly along the head-impacting portion 24 and downwardly along the knee-impacting portion 22, as shown in FIGS. 4A-4B. The forward-facing panel 56 may, for example, extend from the base 50 to the rearward-facing panel 58. For example, the forward-facing panel 56 may extend upwardly along the head-impacting portion 24 and downwardly along the knee-impacting portion 22, as shown in FIGS. 4A-4B.

The head-impacting portion 24 and the knee-impacting portion 22 may extend in opposite directions from the base 50 in the uninflated position, as shown in FIG. 2. The head-impacting portion 24 may extend, for example, upwardly relative to the base 50, i.e., away from the base 50 towards the roof 36 of the vehicle 10. The knee-impacting portion 22 may extend, for example, downwardly relative to the base 50, i.e., away from the base 50 towards the floor 38 of the vehicle 10.

The head-impacting portion 24 and the knee-impacting portion 22 may be rolled in opposite directions relative to the base 50 in the uninflated position, as shown in FIG. 2. The head-impacting portion 24 may be rolled, i.e., turned over on itself, in a counterclockwise direction CCW towards the base 50. The knee-impacting portion 22 may be rolled, i.e., turned over on itself, in a clockwise direction CW towards the base 50. In such an example, the head-impacting portion 24 and the knee-impacting portion 22 each may be rolled towards the base 50. Alternatively, the head-impacting portion 24 and the knee-impacting portion 22 each may be rolled away from the base 50. In such an example, the head-impacting portion 24 may be rolled in the clockwise direction CW, and the knee-impacting portion may be rolled in the counterclockwise direction CCW.

With reference to FIGS. 3-4B, the head-impacting portion 24 and the knee-impacting portion 22 may extend in opposite directions from the base 50 in the inflated position. The head-impacting portion 24 may extend upwardly from the base 50 in the inflated position. In other words, the head-impacting portion 24 may extend from the base 50 towards the roof 36 in the inflated position. Said differently, the head-impacting portion 24 may be disposed between the user interface 44 and the front seats 16 in the inflated position, as shown in FIG. 4A. The knee-impacting portion 22 may extend downwardly from the base 50 in the inflated position. In other words, the knee-impacting portion 22 may extend from the base 50 towards the floor 38 in the inflated position.

With reference to FIGS. 4A-4B, the head-impacting portion 24 may extend to an upper distal end 60 and the knee-impacting portion 22 may extend to a lower distal end 62. The upper distal end 60 may be spaced from the base 50 in the inflated position. The upper distal end 60 may be disposed between the base 50 and the roof 36, e.g., adjacent to the windshield. Additionally, the upper distal end 60 may be disposed between the bulkhead 14 and the vertex 20. The lower distal end 62 may be disposed between the base 50 and the floor 38. In other words, the lower distal end 62 may be spaced from the upper distal end 60. Additionally, the lower distal end 62 may be disposed between the bulkhead 14 and the vertex 20.

With continued reference to FIGS. 4A-4B, the vertex 20 may be disposed between the upper distal end 60 and the lower distal end 62. Specifically, the vertex 20 may be disposed on the rearward-facing panel 58. The rearward-facing panel 58 may be convex relative to the seat 16. In other words, the upper distal end 60 and the lower distal end 62 each may be disposed between the vertex 20 and the bulkhead 14 in the vehicle-fore-and-aft direction Da. In this situation, the airbag 18 may taper from the vertex 20 to each distal end 60, 62. For example, the head-impacting portion 24 may taper upwardly and towards the bulkhead 14. In other words, the head-impacting portion 24 may extend away from the occupant, i.e., towards the bulkhead 14, from the vertex 20 to the upper distal end 60. Specifically, the rearward-facing panel 58 may extend more in the vehicle-fore-and-aft direction Da, i.e., from the vertex 20 to the upper distal end 60, than the forward-facing panel 56, i.e., from the upper distal end 60 to the base 50.

Additionally, the knee-impacting portion 22 tapers downwardly and towards the bulkhead 14, as set forth above. In other words, the knee-impacting portion 22 may extend away from the occupant, i.e., towards the bulkhead 14, from the vertex 20 to the lower distal end 62. Specifically, the rearward-facing panel 58 may extend more in the vehicle-fore-and-aft direction Da, i.e., from the vertex 20 to the lower distal end 62, than the forward-facing panel 56, i.e., from the lower distal end 62 to the base 50. The knee-impacting portion 22 and the head-impacting portion 24 may taper any suitable amount from the vertex to the respective distal end 60, 62. Additionally, the knee-impacting portion 22 and the head-impacting portion 24 may taper any suitable amount towards the bulkhead 14. The knee-impacting portion 22 and the head-impacting portion 24 may taper a same or a different amount towards both the bulkhead 14 and the respective distal end 60, 62.

The knee-impacting portion 22 may be disposed adjacent to knees of an occupant between 5th-percentile female and 95th-percentile male stature sitting in the seat 16, as shown in FIGS. 4A-4B. For example, the knee-impacting portion 22 may be positioned to receive and be impacted by the knees of the occupant, e.g., between 5th-percentile female and 95th-percentile male stature, seated in the respective seat 16 when the airbag 18 is inflated during an impact that urges the occupant towards the airbag 18. Specifically, when the airbag 18 is in the inflated position, the bulkhead 14 may provide a counteracting force against the knee-impacting portion 22 when the knee-impacting portion 22 is impacted by the knees of the occupant such that the knee-impacting is squeezed between the knees of the occupant and the bulkhead 14. The $5^{th}$ percentile female and $95^{th}$ percentile male stature may be based on a standards-setting body, e.g., a government agency such as the National Highway Traffic Safety Administration (NHTSA). As one example, NHTSA has defined the $5^{th}$ percentile female stature to be 5 feet tall and 1 pounds, e.g., the Hybrid III $5^{th}$ percentile female. As another example, NHTSA has defined the $95^{th}$ percentile male stature to be 6 feet 2 inches tall and 2 pounds, e.g., the Hybrid III $95^{th}$ percentile male.

With reference to FIG. 3, the head-receiving depression 26 may be spaced from each side 52, 54 of the airbag 18. In other words, the head-receiving depression 26 may be disposed between the sides 52, 54 of the airbag 18. The head-receiving depression 26 may be spaced from the vertex 20 and the upper distal end 60. The head-receiving depression 26 may be disposed on the rearward-facing panel 58. In other words, the head-receiving depression 26 may face the occupant of the seat 16.

The head-receiving depression 26 is round, as set forth above. In other words, the head-receiving depression 26 may be, e.g., circular, oval, elliptical, etc., on the rearward-facing panel 58. Said differently, the head-receiving depression 26 may have any suitable round shape, e.g., semi-spherical, semi-ovoidal, semi-ellipsoidal, etc. The head-receiving depression 26 may have any suitable size, e.g., diameter. The head-receiving depression 26 may have any suitable depth. In other words, the head-receiving depression 26 may extend any suitable amount towards the bulkhead 14. For example, the depth of the head-receiving depression 26 may be such that the sides 52, 54 of the airbag 18 may catch, i.e., slow or stop, the head of the occupant from sliding out of the head-receiving depression 26 during an oblique impact. Said differently, the sides 52, 54 of the airbag 18 may retain the head of the occupant in the head-receiving depression 26.

With reference to FIGS. 4A-4B, the head-receiving depression 26 may be positioned to receive and be impacted by the head of the occupant between 5th-percentile female and 95th-percentile male stature seated in the respective seat 16 when the airbag 18 is inflated during an impact that urges the occupant towards the airbag 18. When the airbag 18 is in the inflated position, the windshield may provide a counteracting force against the head-impacting portion 24 when the head-receiving depression 26 is impacted by the head of the occupant such that the head-impacting portion 24 is squeezed between the head of the occupant and the windshield.

The airbag assembly 48 may include an inflator 64 in fluid communication with the airbag 18 that inflates the airbag 18 from the uninflated position to the inflated position. The inflator 64 expands the airbag 18 with inflation medium, such as a gas, to move the airbag 18 from the uninflated position to the inflated position.

The inflator 64 may be elongated in the cross-vehicle direction Dc. The inflator 64 may have any suitable shape, e.g., cylindrical. The inflator 64 may be supported by any suitable component. For example, the inflator 64 may be mounted to the bulkhead 14, as shown in FIG. 1. As another example, the inflator 64 may be supported by the base 50. Each airbag assembly 48 may include one inflator 64. In other words, the system 12 may include two inflators 64 each in fluid communication with one respective airbag 18. Alternatively, the system 12 may include one inflator 64 in fluid communication with each airbag 18.

The inflator 64 may be, for example, a pyrotechnic inflator that uses a chemical reaction to drive the inflation medium into the airbag 18. Alternatively, the inflator 64 may be, for example, a cold-gas inflator that, when activated, ignites a pyrotechnic charge that creates an opening for releasing the pressurized inflation medium to the airbag 18 via a fill tube (not shown). Alternatively, the inflator 64 may be of any suitable type, for example, a hybrid inflator.

Figure 5:
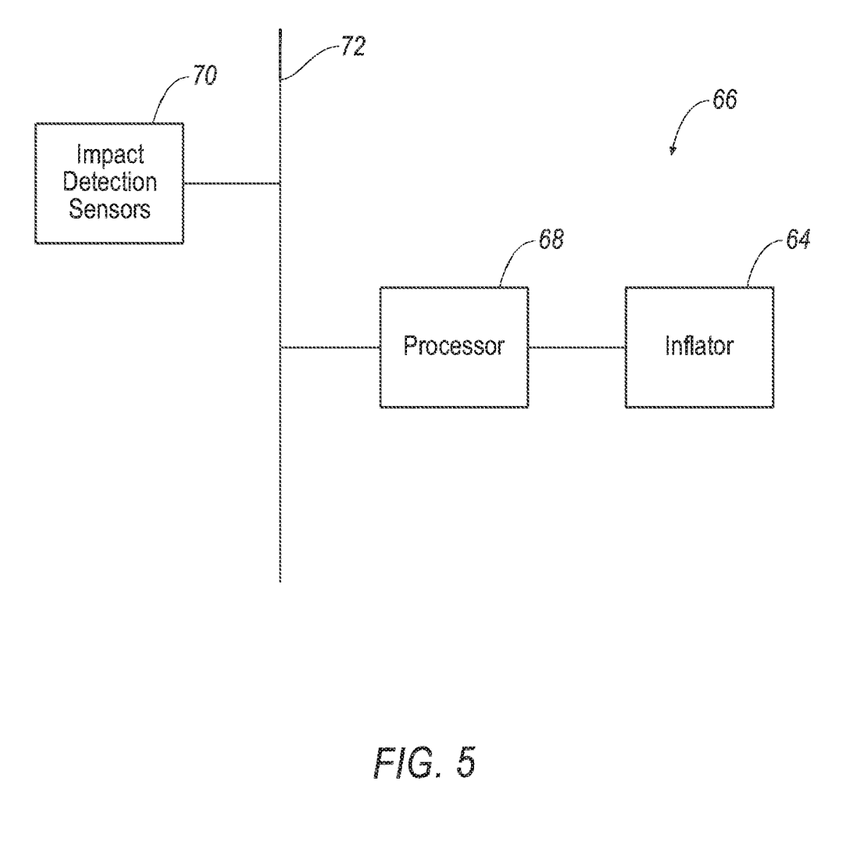
FIG. 5 is a block diagram of an inflation system of the vehicle.

With reference to FIG. 5, the vehicle 10 may include an inflation system 66 having a computer. The computer may be a microprocessor-based computing device implemented via circuits, chips, or other electronic components. For example, the computer may include a processor 68, memory, etc. The memory may store instructions executable by the processor 68 and the processor 68 may read the instructions from the memory and execute the instructions. The processor 68 may be programmed to initiate an inflation of the airbag 18 in response to the vehicle impact.

The vehicle 10 may include impact detection sensors 70 programmed to detect the vehicle impact to the vehicle 10. The impact detection sensors 70 may be disposed in the vehicle 10. The impact detection sensors 70 may be of various types, e.g., pressure sensor, acceleration sensor, vision sensor, etc. When the vehicle impact occurs, the processor 68 may receive one or more signals from the impact detection sensors 70 indicating the vehicle impact. In response to receiving the signals from the impact detection sensors 70, the processor 68 may initiate the inflation of the airbag 18. Alternatively, the processor 68 may initiate the inflation of the airbag 18 selectively based on information from the impact detection sensors 70 identifying the physical characteristics of the vehicle impact, e.g., which side of the vehicle impacted, amount of pressure applied to the vehicle, etc. and also seat occupancy information, e.g., by using the occupancy sensors disposed inside the seats 16 sensing the occupancy status of the seats 16.

In order to receive the signals from the sensors, e.g., the impact detection sensors 70, and to initiate the inflation of the airbag 18, the processor 68 communicates with the sensors, e.g., the impact detection sensors 70, and the inflator 64, e.g., through a direct electrical wiring, through which an analog or a digital signal is transmitted, or through a communication network 72 like CAN (Control Area Network), Ethernet, LIN (Local Interconnect Network) or any other way.

Computing devices, such as the computer, generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In operation, the airbag 18 is in the uninflated position, under normal operating conditions of the vehicle 10. In the event of a vehicle impact, the impact detection sensors 70 detect the impact. The impact detection sensors 70 transmit a signal indicating the vehicle impact collision through the communication network 72 to the computer. When the vehicle impact is detected, the computer transmits a signal through the communication network 72 triggering the inflator 64 to inflate the airbag 18 with inflation medium from the uninflated position to the inflated position. When the inflator 64 inflates the airbag 18 to the inflated position, the inflation medium flows into the inflation chamber, increasing the pressure in the inflation chamber. As the pressure is increased in the inflation chamber, the airbag 18 extends away from the bulkhead 14. Specifically, the head-impacting portion 24 extends upwardly and the knee-impacting portion 22 extend downwardly relative to the bulkhead 14. As the occupant moves forward, i.e., towards the bulkhead 14, due to momentum of the vehicle impact, the occupant moves towards the head-impacting portion 24 and the knee-impacting portion 22. When the occupant impacts the airbag 18, the knees of the occupant may impact the knee-impacting portion 22, and the head of the occupant may impact the head-impacting portion 24, and specifically, the head-receiving depression 26, such that the airbag 18 controls the kinematics of the occupant. When the occupant impacts the airbag 18, the knee-impacting portion 22 urges the occupant to remain generally upright, which aligns the head of the occupant with the head-receiving depression 26, and the head-receiving depression 26 urges the head of the occupant to remain on the airbag 18.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A system comprising;
a bulkhead;
a seat spaced from the bulkhead;
an airbag supported by the bulkhead and inflatable towards the seat to an inflated position, the airbag in the inflated position including a vertex spaced from the bulkhead, a knee-impacting portion tapering from the vertex downwardly and towards the bulkhead; and
a head-impacting portion extending upwardly from the vertex and including a head-receiving depression, the head-receiving depression being round;
wherein the airbag includes sides spaced from each other in a cross-vehicle direction and extending along the head-impacting portion and the knee-impacting portion, the head-receiving depression is spaced from each side.

2. The system of claim 1, further comprising front pillars spaced from each other in the cross-vehicle direction, the sides of the airbag spaced from each front pillar.

3. The system of claim 1, further comprising a base supported by the bulkhead and supporting the airbag, the head-impacting portion is inflatable upwardly relative to the base and the knee-impacting portion is inflatable downwardly relative to the base.

4. The system of claim 1, further comprising a base supported by the bulkhead and supporting the airbag, the head-impacting portion and the knee-impacting portion are rolled in opposite directions relative to the base in an uninflated position.

5. The system of claim 1, wherein the head-impacting portion tapers upwardly and towards the bulkhead.

6. The system of claim 1, further comprising an inflator in fluid communication with the airbag, the inflator supported by the bulkhead and elongated in a cross-vehicle direction.

7. The system of claim 1, wherein the bulkhead is generally planar.

8. The system of claim 1, wherein the bulkhead supports a user interface, the head-impacting portion in the inflated position is disposed between the seat and the user interface.

9. The system of claim 1, wherein the bulkhead includes a recess extending away from the seat, the airbag is disposed in the recess.

10. The system of claim 1, further comprising a second seat spaced from the bulkhead and a second airbag supported by the bulkhead and inflatable towards the second seat to the inflated position, and wherein the second seat and the second airbag are each spaced from the seat and the airbag in a cross-vehicle direction, the second airbag being identical to the airbag.

11. The system of claim 10, further comprising a second inflator spaced from the inflator and in fluid communication with the second airbag, the second inflator supported by the bulkhead and elongated in a cross-vehicle direction.

12. The system of claim 10, wherein the bulkhead includes two recesses each being disposed in front of one respective seat, each airbag is disposed in one respective recess.

13. The system of claim 1, wherein the head-receiving depression is positioned to receive a head of an occupant between 5th-percentile female and 95th-percentile male stature sitting in the seat.

14. The system of claim 1, wherein the knee-impacting portion is disposed adjacent to knees of an occupant between 5th-percentile female and 95th-percentile male stature sitting in the seat.

15. An airbag assembly comprising:
a base;
an airbag supported by the base and inflatable to an inflated position, the airbag in the inflated position including a vertex spaced from the base, a knee-impacting portion tapering from the vertex downwardly and towards the base; and
a head-impacting portion extending upwardly from the vertex and including a head-receiving depression, the head-receiving depression being round;
wherein the airbag includes sides spaced from each other and extending along the head-impacting portion and the knee-impacting portion, the head-receiving depression is spaced from each side.

16. The airbag assembly of claim 15, wherein the head-impacting portion is inflatable upwardly relative to the base and the knee-impacting portion is inflatable downwardly relative to the base.

17. The airbag assembly of claim 15, wherein the head-impacting portion and the knee-impacting portion are rolled in opposite directions relative to the base in an uninflated position.

18. The airbag assembly of claim 15, wherein the head-impacting portion tapers upwardly and towards the base.

19. A system comprising;
a bulkhead;
a seat spaced from the bulkhead;
an airbag supported by the bulkhead and inflatable towards the seat to an inflated position, the airbag in the inflated position including a vertex spaced from the bulkhead, a knee-impacting portion tapering from the vertex downwardly and towards the bulkhead; and
a head-impacting portion extending upwardly from the vertex and including a head-receiving depression, the head-receiving depression being round;
wherein the bulkhead supports a user interface, the head-impacting portion in the inflated position is disposed between the seat and the user interface.

* * * * *